Dec. 7, 1948.  R. B. BELL  2,455,725
WINDSHIELD WIPER MECHANISM
Filed June 29, 1943
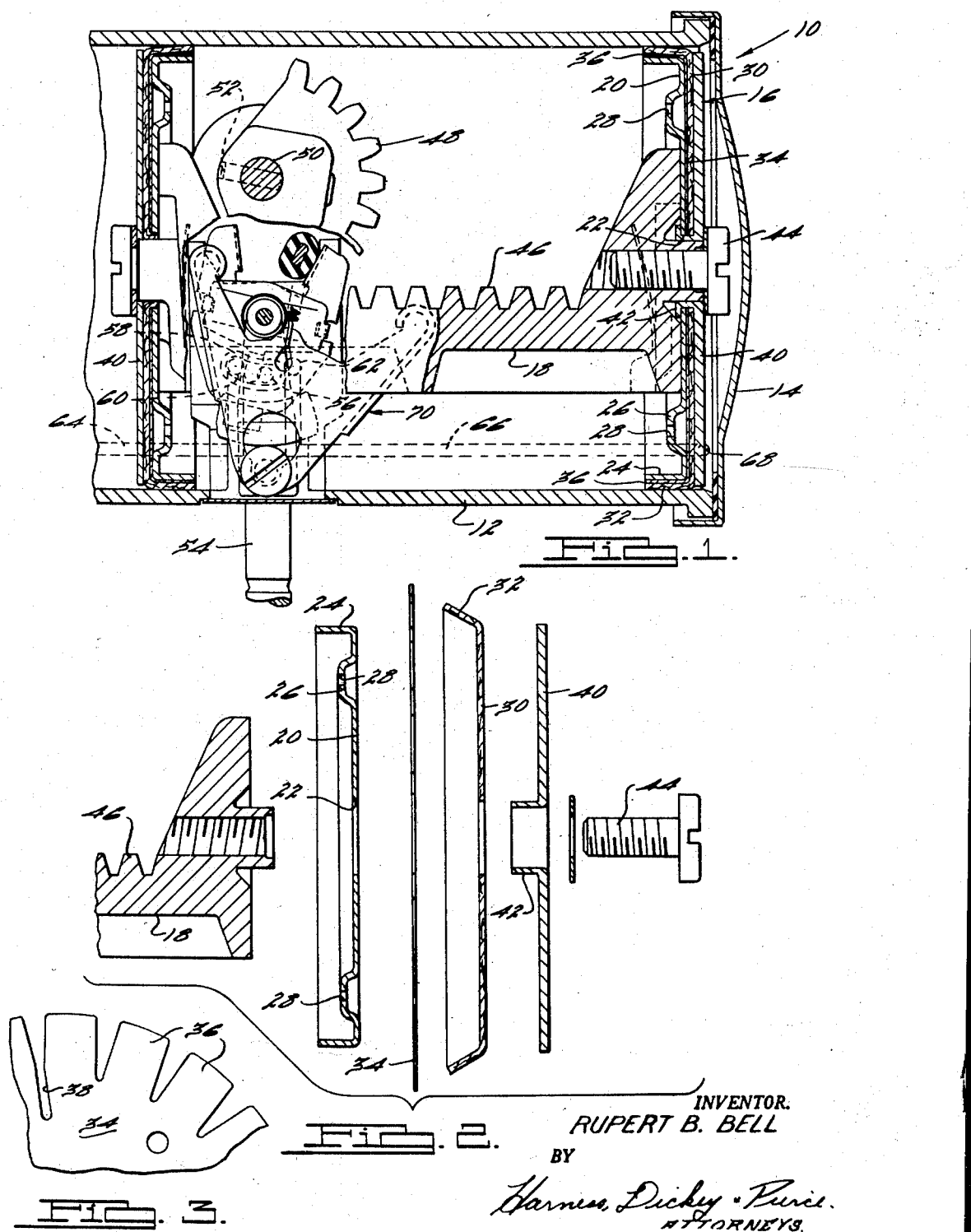
INVENTOR.
RUPERT B. BELL
BY
Harness, Dickey & Pierce
ATTORNEYS.

Patented Dec. 7, 1948

2,455,725

UNITED STATES PATENT OFFICE 2,455,725

WINDSHIELD WIPER MECHANISM

Rupert B. Bell, Ann Arbor, Mich., assignor to King-Seeley Corporation, Ann Arbor, Mich., a corporation of Michigan Application June 29, 1943, Serial No. 492,734

8 Claims. (Cl. 309—34)

The present invention relates to lubricated piston structures for fluid motors and the present application is a division of applicant's copending application Serial No. 379,664, now Patent No. 2,354,189, filed February 19, 1941.

The principal objects of the invention are to provide improved piston structures for fluid motors; to provide such structures embodying improved lubricant containing reservoir means; and to provide such structures incorporating means to protect the lubricant by continuously venting the reservoir space to atmosphere.

In the drawing in which like numerals are used to designate like parts in the several views throughout:

Figure 1 is a broken cross sectional view having parts broken away of a fluid motor constructed according to the present invention;

Fig. 2 is a exploded view of the piston assembly at one end of the motor illustrated in Fig. 1; and Fig. 3 is a broken plan view of the piston assembly spring.

The motor 10 includes a casing 12 which is generally cylindrical in shape, thus providing a piston cylinder, and which has removable end caps 14 secured to the opposite open ends thereof. Such end caps 14 are removably and sealably connected to the ends of the cylinder so as to seal the interior thereof against leakage through the ends.

The cylinder 12 receives therein a piston comprising a pair of piston cup assemblies 16, which are connected by a longitudinally extending rack member 18. Each of such assemblies 16 includes a disc-shaped pressure plate 20, having a central opening 22 therethrough and having an annular flange 24 formed at the outer periphery thereof which is disposed substantially parallel to the inner surface of the cylinder 12. Such member 20 is also provided with an annular inset portion 26 having a pair of diametrically opposed, relatively small openings 28 therethrough, which provides a lubrication chamber in a manner that will be described in detail hereinafter.

A disc-shaped piston cup 30 of suitable material is superimposed over the member 20, and has an annular flange portion 32 which is adapted to bear against the inner surface of cylinder 12. The piston spring 34, which is generally disc-shaped having a plurality of annularly spaced, resilient fingers 36 formed adjacent the periphery thereof by radially extending slots, is interposed between the member 30 and the facing surface of member 20. The fingers 36 are bent into the position shown, so that such fingers resiliently urge the peripheral flange 32 of the piston cup 30 against the inner surface of cylinder 12. Such member 34 is also provided with a plurality of radially inwardly extending slots 38 at a suitable number of positions therearound. Such slots 38 extend inwardly from selected ones of the radial peripheral slots to a position adjacent the chamber formed by the annular inset 26 so that lubricant, which is introduced through openings 28, may be conducted from such chamber outwardly onto the periphery of the piston cups 30 for the purpose of lubricating the sliding action of the piston assemblies 16. A backing plate 40, which is generally disc-shaped and has an inwardly turned flange 42 which provides a central opening therethrough and projects through the opening 22 and engages the inner surface of the member 20, engages the outer surface of member 30. A suitable means, such as screw 44, is received through the central opening and engages the end of the member 18 for the purpose of securing the piston cup assembly 16 to the member 18.

It will thus be seen that the complete piston assembly, including the end assemblies 16 and the interconnecting member 18, is free to slide within the cylinder 12 in response to pressure differentials at opposite ends thereof. In the motor here shown, such pressure differentials are created by means of alternately creating vacuum and atmospheric pressure at opposite ends of the cylinder, in a manner that will be described in detail hereinafter, so that the piston assembly is caused to reciprocate within the cylinder 12.

During such reciprocation, the teeth 46 of the rack 18 mesh with the teeth of a segmental drive gear 48. Such gear 48 is mounted on a drive shaft 50 and is fixed thereto by means of a suitable set screw 52. The drive shaft 50 is rotatably mounted within suitable bearing openings formed in the housing 12 and projects outwardly thereof and carries suitable drive means.

The vacuum within the cylinder 12 is created through an inlet stem 54 mounted on the casing 12 at one side and at substantially the longitudinal center thereof. Such inlet stem communicates with a suction port 56 in a valve seat formed on an inner surface of the cylinder 12 and along which a reversing valve 58 slides. Also opening through the just-mentioned valve seat are ports 60 and 62 which communicate, respectively, with passageways 64 and 66, which are formed in the casing 12 and which extend to opposite ends of the cylinder and communicate with the interior thereof through openings 68 adjacent the ends thereof.

The reversing valve 58 is adapted to be slidably positioned over the ports 56, 60 and 62 and is of such a construction that it is shiftable to communicate the suction supply port 56 with either one of the ports 60 or 62. When in communication with one of the ports, the vacuum is created in one end of the cylinder, while the opposite end is vented to atmosphere, so that the piston is caused to move toward said one end. When the valve is shifted to communicate the suction supply port 56 with the other of the ports 60 and 62, it will be obvious that the movement of the piston is reversed. For example, when the reversing valve 58 is in the position in which it connects the suction supply port 56 to the port 62, a subatmospheric pressure is created at one end of the cylinder through the passageway 66 and the opposite end of the cylinder is vented to the atmosphere through the uncovered port 60.

The valve 58 may be automatically moved between the described positions, in response to movement of the assembly comprising the piston cup assemblies 16 and the interconnecting rack 18, by any suitable valve shifter mechanism. The valve shifter mechanism of the illustrated embodiment is generally indicated at 70 and is described in greater detail in United States Letters Patent No. 2,354,189 granted to applicant, dated July 25, 1944. For the present purposes, it is sufficient to state that the operation of the mechanism 70 is such that, during operation of the motor as the piston assembly approaches each end of the cylinder 12, the valve 58 is moved to a position in which it reverses the application of fluid pressure in the cylinder, causing the piston assembly to reverse its movement.

The motor 10 may also be provided with suitable control valve means (not shown) which may be of a construction permitting the parking which is common in windshield wiper systems, an example of which is described in the above mentioned Letters Patent of the United States No. 2,354,189.

Formal changes may be made in the specific embodiment of the invention described without departing from the spirit and substance of the invention.

What is claimed is:

1. In a fluid motor construction, a casing, a piston slidably disposed therein, said piston including a disc-shaped member, a cup-shaped member superimposed over said disc member having an annular flanged portion which slidably engages the inner walls of said casing, another disc-shaped member interposed between said first two members having resilient portions adjacent the periphery thereof which engage said flange to resiliently urge said flange into engagement with said inner walls, said first and third named members being so constructed and arranged as to provide a lubrication chamber therebetween, and means formed in one of said first and third named members to conduct the lubricant from said chamber outwardly to the periphery of said second named member.

2. In a fluid motor construction, a casing, a piston slidably disposed therein, said piston including a disc-shaped member, a cup-shaped member superimposed over said disc member having an annular flanged portion which slidably engages the inner walls of said casing, another disc-shaped member interposed between said first two members having resilient portions adjacent the periphery thereof which engage said flange to resiliently urge said flange into engagement with said inner walls, said first and third named members being so constructed and arranged as to provide a lubrication chamber therebetween, and radially extending grooves formed in one of said first and third named members communicating with said lubrication chamber to conduct the lubricant from said chamber outwardly to the periphery of said second named member.

3. In a fluid motor construction, a casing, a piston slidably disposed therein, said piston including a disc-shaped member, a cup-shaped member superimposed over said disc member having an annular flanged portion which slidably engages the inner walls of said casing, another disc-shaped member interposed between said first two members having resilient portions adjacent the periphery thereof which engage said flange to resiliently urge said flange into engagement with said inner walls, said first and third named members being so constructed and arranged as to provide a lubrication chamber therebetween, and means forming passageways in said third named member communicating with said lubrication chamber and extending outwardly to said resilient portions to conduct lubricant to the periphery of said second named member.

4. In a piston for association with a casing, the combination of a body member, a sealing member associated with said body member and having peripheral portions which extend beyond said body member for slidable engagement with said casing, means forming a lubrication chamber between said first and second members, and means including means interposed between said first and second members and communicating with said chamber for conducting lubricant therefrom into contact with said portions of said sealing member, said means including resilient means for urging said portions of said sealing member into engagement with said casing.

5. In a piston for association with a casing, the combination of a body member, a sealing member associated with said body member and having peripheral portions which extend beyond said body member for slidable engagement with said casing, means forming a lubrication chamber in said first-mentioned member, and means including means interposed between said first and second members for conducting lubricant from said chamber into contact with said portions of said sealing member, said means including resilient means for urging said portions of said sealing member into engagement with said casing.

6. In a piston for association with a casing, the combination of a body member, a sealing member associated with said body member and having peripheral portions which extend beyond said body member for slidable engagement with said casing, means forming a lubrication chamber in said first-mentioned member, and means including means interposed between said first and second members, for conducting lubricant from said chamber into contact with said portions of said sealing member, said last-mentioned means having at least one perforation affording communication between said chamber and said sealing member.

7. In a fluid motor having a body defining a chamber, a piston structure movable back and forth in said chamber under the influence of differential fluid pressures alternately and reversely applied to the respectively opposite faces of such structure, sealing means carried by the piston structure and slidably engaging the chamber wall, said piston structure defining reservoir means for containing lubricant for lubricating said sealing means, said sealing means being in communication with said reservoir means, and means continuously venting said reservoir means to a region which is at a pressure substantially equal to atmospheric pressure.

8. The structure of claim 7 wherein said piston structure comprises a pair of spaced but interconnected piston elements the space between which is continuously maintained at said one of said pressures, wherein said reservoir means comprises a reservoir space individual to each said piston element and carried thereby and wherein said reservoirs are vented to the space between said piston elements.

RUPERT B. BELL.

REFERENCES CITED

The following references are of record in the file of this patent:

UNITED STATES PATENTS

| Number | Name | Date |
|---|---|---|
| 772,457 | Cramer | Oct. 18, 1904 |
| 1,028,426 | Braymer | June 4, 1912 |
| 1,294,023 | Arbuckle | Feb. 11, 1919 |
| Re. 14,707 | Arbuckle | Aug. 19, 1919 |
| 1,360,297 | Cass | Nov. 30, 1920 |
| 1,665,965 | Koenig | Apr. 10, 1928 |
| 2,163,399 | Hewitt | June 20, 1939 |
| 2,260,435 | Campbell | Oct. 28, 1941 |